(12) United States Patent
Taylor

(10) Patent No.: US 11,555,568 B2
(45) Date of Patent: Jan. 17, 2023

(54) CORRUGATED TUBE FITTING

(71) Applicant: ABB Schweiz AG, Baden (CH)

(72) Inventor: Phillip Taylor, Germantown, TN (US)

(73) Assignee: ABB SCHWEIZ AG, Baden (CH)

( * ) Notice: Subject to any disclaimer, the term of this patent is extended or adjusted under 35 U.S.C. 154(b) by 155 days.

(21) Appl. No.: 17/097,345

(22) Filed: Nov. 13, 2020

(65) Prior Publication Data
US 2022/0154863 A1    May 19, 2022

(51) Int. Cl.
*F16L 37/091* (2006.01)

(52) U.S. Cl.
CPC ................... *F16L 37/091* (2013.01)

(58) Field of Classification Search
CPC ... F16L 37/0847; F16L 37/091; F16L 37/098; F16L 37/0985; F16L 37/096; F16L 37/133; F16L 37/127
USPC .......................................... 285/319, 903, 321
See application file for complete search history.

(56) References Cited

U.S. PATENT DOCUMENTS

2016/0327196 A1* 11/2016 Gledhill ................ F16L 37/091

* cited by examiner

*Primary Examiner* — Aaron M Dunwoody
(74) *Attorney, Agent, or Firm* — Greenberg Traurig, LLP

(57) ABSTRACT

A two-piece fitting for corrugated tubing having a body and one or more snap rings. Each snap ring is securely housed within the body near an opening to an inner area of the body. A plurality of first and second slots can extend in opposing directions through a ring wall of the snap ring. The first slots can, at least in part, define ring fingers having retention projections, and which are configured to provide an inwardly directed spring force at least at a first end of the snap ring. The second slots extend into at least some of the ring fingers, and can provide a second end of the snap ring with a generally outwardly directed spring force. An inner surface of the snap ring can be outwardly tapered at the second end of the snap ring to reduce the force used to insert the tube through the snap ring.

15 Claims, 8 Drawing Sheets

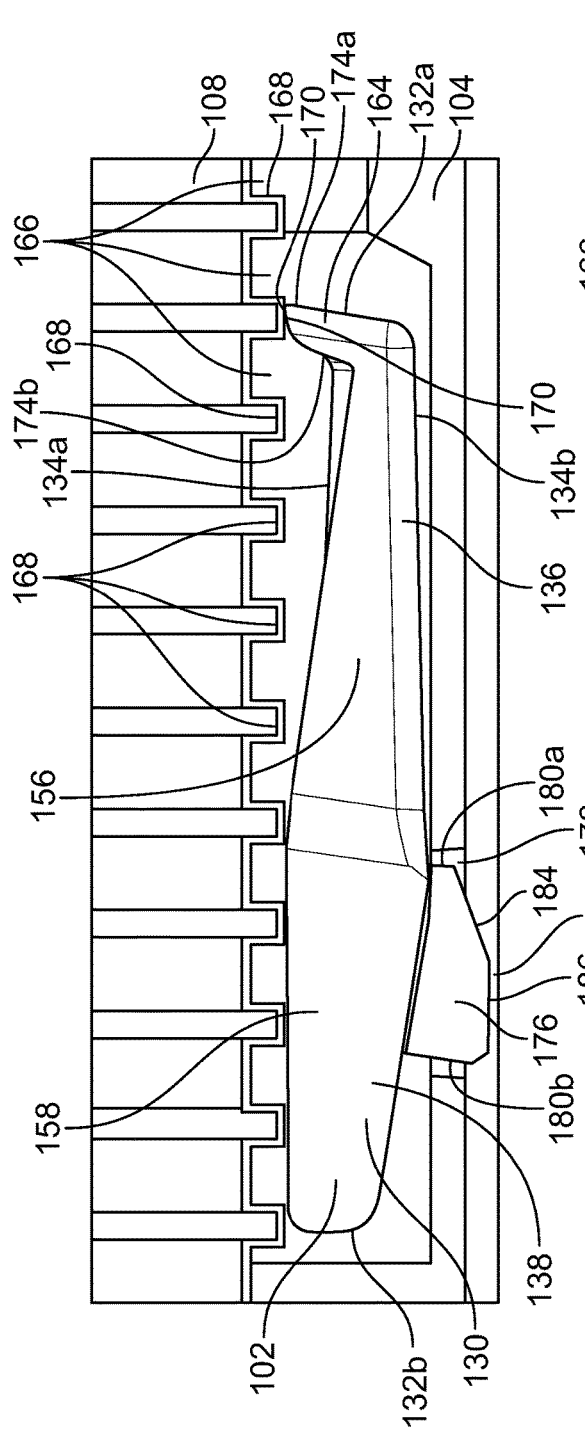
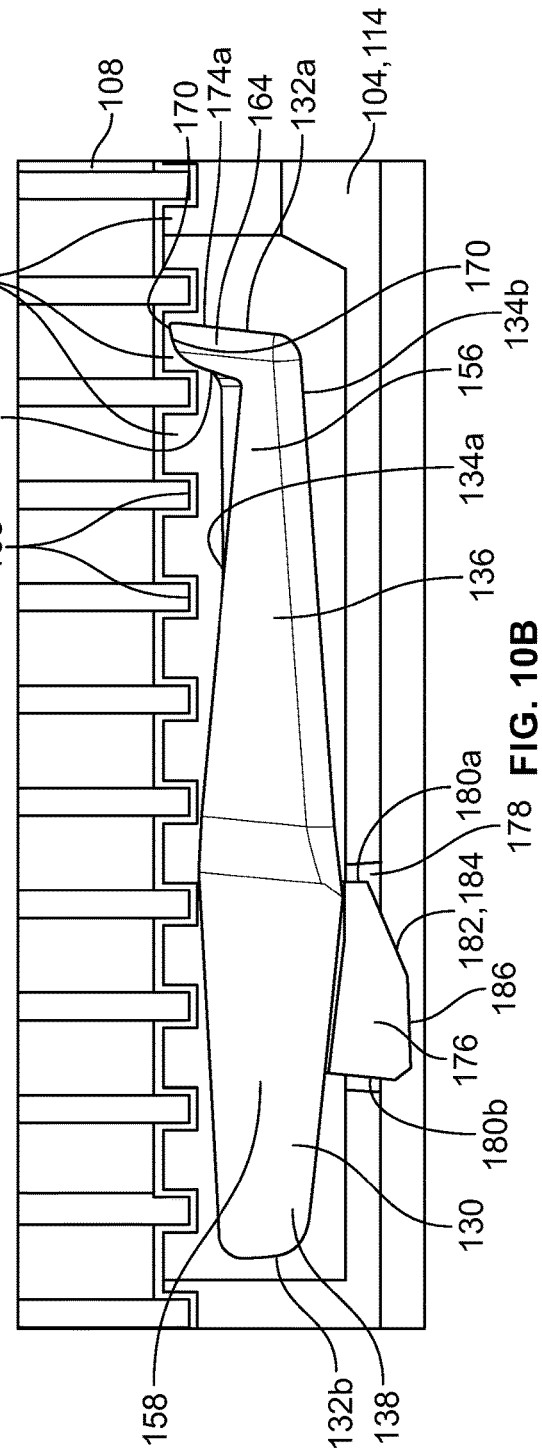

CORRUGATED TUBE FITTING

FIELD OF INVENTION

The present invention relates to fittings for tubing, and more particularly, a two-piece fitting for corrugated tubes.

BACKGROUND

Tubes can be mechanically coupled to other tubes or fittings in a variety of manners, including for example, by mechanical fasteners. At times, at least certain types of mechanical fasteners can present difficulties, or at least temporarily interfere, with the ability to securely insert a tube into a mating fitting. Often such difficulties can be overcome by application of relatively large insertion forces being exerted against the tubing and/or fitting. Yet, having to resort to the use of such relatively large insertion forces can increase the overall difficulty, and time associated with, installing assemblies having such tubings and fittings, as well as place undue burdens on the installer(s). Further, in at least some situations, such relatively high insertion forces can enhance the possibility of damaging the tubing and/or fitting, which can result in undesired breaches or interruptions in the resulting coupling or connection. Use of such relatively high insertion forces can also lead to damaging the tubing and/or fitting, which may necessitate the replacement of one or more of those components, thereby further increasing installation costs.

Additionally, at least certain types of fasteners utilized with fittings can fail to provide sufficient strength to prevent subsequent disconnection between the tube and the fitting. For example, at least certain types of mechanical fasteners can provide insufficient retention force, and thus the associated connection between the tubing and mating fitting can be susceptible to disconnection via the tube being pulled out of the fitting. Further, attempts to overcome such deficiencies are often directed to overbuilding the fastener, which can result in higher costs for the fastener and/or associated fitting.

Accordingly, although various mechanical fasteners for use with fittings are available currently in the marketplace, further improvements are possible to provide various types of fittings having a mechanical fastener(s) that can accommodate a tube being inserted into the mating fitting using relatively low insertion forces, while also providing ample force to prevent subsequent disconnection between the tube and the fitting.

BRIEF SUMMARY

An aspect of an embodiment of the present application is a fitting that is adapted to be coupled to a tube, the fitting including body having an opening that is in fluid communication with an inner region of the body, and a snap ring that is positioned within the inner region. The snap ring can have a ring wall, a plurality of first slots, a plurality of second slots, and a plurality of ring fingers. The ring wall can extend between a first end and a second end of the snap ring. Further, an inner surface of the ring wall can define an interior region of the snap ring that is sized to receive insertion of the tube through the snap ring. Each first slot of the plurality of first slots can extend through the first end and in a direction that is generally toward the second end along a first segment of the ring wall, and end at a first end wall of the first slot. Further, an outer surface of the first segment can have a conical configuration. Additionally, each ring finger of the plurality of ring fingers can be defined at least in part by an area of the first segment that is positioned between adjacent first slots of the plurality of first slots. Further, each second slot of the plurality of second slots can extend from the second end in a direction generally toward the first end to a second end wall, and extend into at least some of the plurality of ring fingers. Further, the second end wall can be in closer proximity than the first end wall to the first end of the snap ring.

Another aspect of an embodiment of the present application is a fitting adapted to be coupled to a tube, the fitting that can include a body having a body wall that defines a plurality of openings and an inner region of the body. Each opening of the plurality of openings can be in fluid communication with the inner region and the other openings of the plurality of openings. Additionally, the body can further include a plurality of retention openings. The fitting also includes a plurality of snap rings, each snap ring of the plurality of snap rings being positioned within the inner region and adjacent to an opening of the plurality of openings. Further, each snap ring of the plurality of snap rings can have a ring wall that extends between a first end and a second end of the snap ring, the ring wall having a first slot set, a second slot set, an inner surface, and an outer surface. The inner surface can define an interior region of the snap ring that is sized to receive insertion of the tube through the snap ring. The outer surface can have a conical configuration. The snap ring can also include a plurality of retention tabs that extend outwardly from the outer surface of the ring wall, and which can be positioned in one of the plurality of retention openings to secure the snap ring to the body. Further, each first slot of the first slot set can be defined by a pair of opposing first slot walls in the ring wall that extend through the ring wall and from the first end of the snap ring in a direction toward the second end of the snap ring to a first end wall of the first slot. The ring wall further comprises a plurality of ring fingers, and each ring finger of the plurality of ring fingers can be defined at least in part by an area of the ring wall that is positioned between adjacent first slots of the first slot set. Further, each ring finger can include a retention projection at the first end of the snap ring, the retention projection extending inwardly from the ring finger and defining at least a portion of an opening to the interior region of the snap ring. Additionally, the opening to the interior region of the snap ring can have a diameter that is smaller than a diameter of the interior region. Further, each second slot of the second slot set can be defined by a pair of opposing second slot walls in the ring wall that can extend through the ring wall and from the second end of the snap ring in a direction toward the first end of the snap ring to a second end wall of the second slot. Additionally, the second end wall can be closer than the first end wall to the first end of the snap ring. Further, each second slot can extend into one ring finger of the plurality of ring fingers.

Additionally, an aspect of an embodiment of the present application is a snap ring for a fitting that is adapted to be coupled to a tube, the snap ring having a ring wall that extends between a first end and a second end of the snap ring. An inner surface of the ring wall can define an interior region of the snap ring that is sized to receive insertion of the tube through the snap ring. The snap ring can also include a plurality of first slots, each first slot of the plurality of first slots extending through the first end and in a direction generally toward the second end along a first segment of the ring wall, and ending at a first end wall of the first slot. Additionally, an outer surface of the first segment can have a conical configuration. The snap ring can also include a plurality of ring fingers, each ring finger of the plurality of ring fingers can be defined at least in part by an area of the first segment that is positioned between adjacent first slots of the plurality of first slots. Additionally, the snap ring can also include a plurality of second slots, each second slot of the plurality of second slots extending from the second end in a direction generally toward the first end to a second end wall, and extending into at least some of the plurality of ring fingers. Further, the second end wall can be in closer proximity than the first end wall to the first end of the snap ring.

These and other aspects of the present invention will be better understood in view of the drawings and following detailed description.

BRIEF DESCRIPTION OF THE DRAWINGS

The description herein makes reference to the accompanying figures wherein like reference numerals refer to like parts throughout the several views.

FIGS. 10A and 10B illustrate schematic representations of a portion of the exemplary snap fitting pivotally displaced between retracted and locking positions, respectively.

Figure 1:
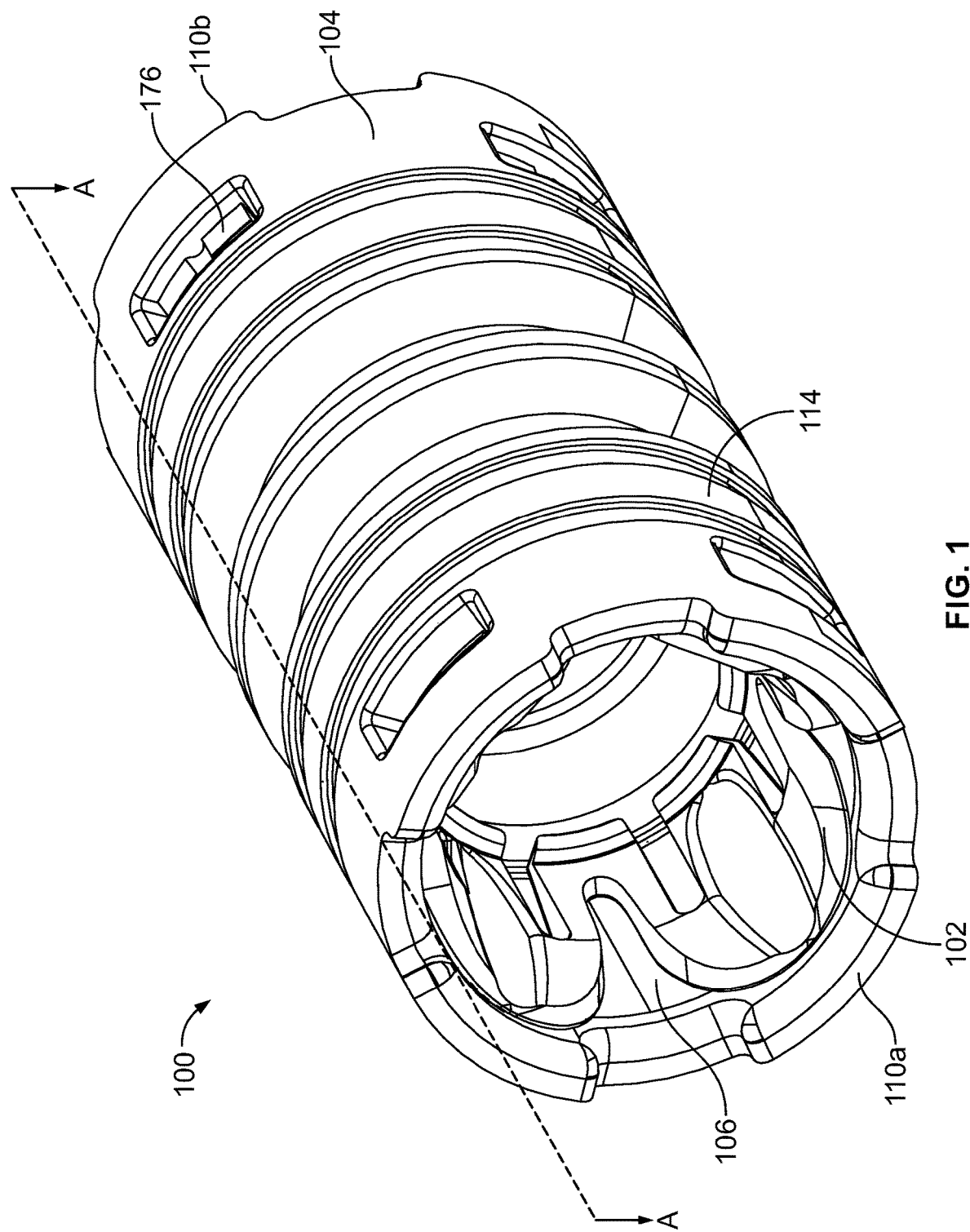
FIG. 1 illustrates a first end perspective view of an exemplary two-piece fitting having a plurality of snap rings according to an illustrated embodiment of the present application.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 2:
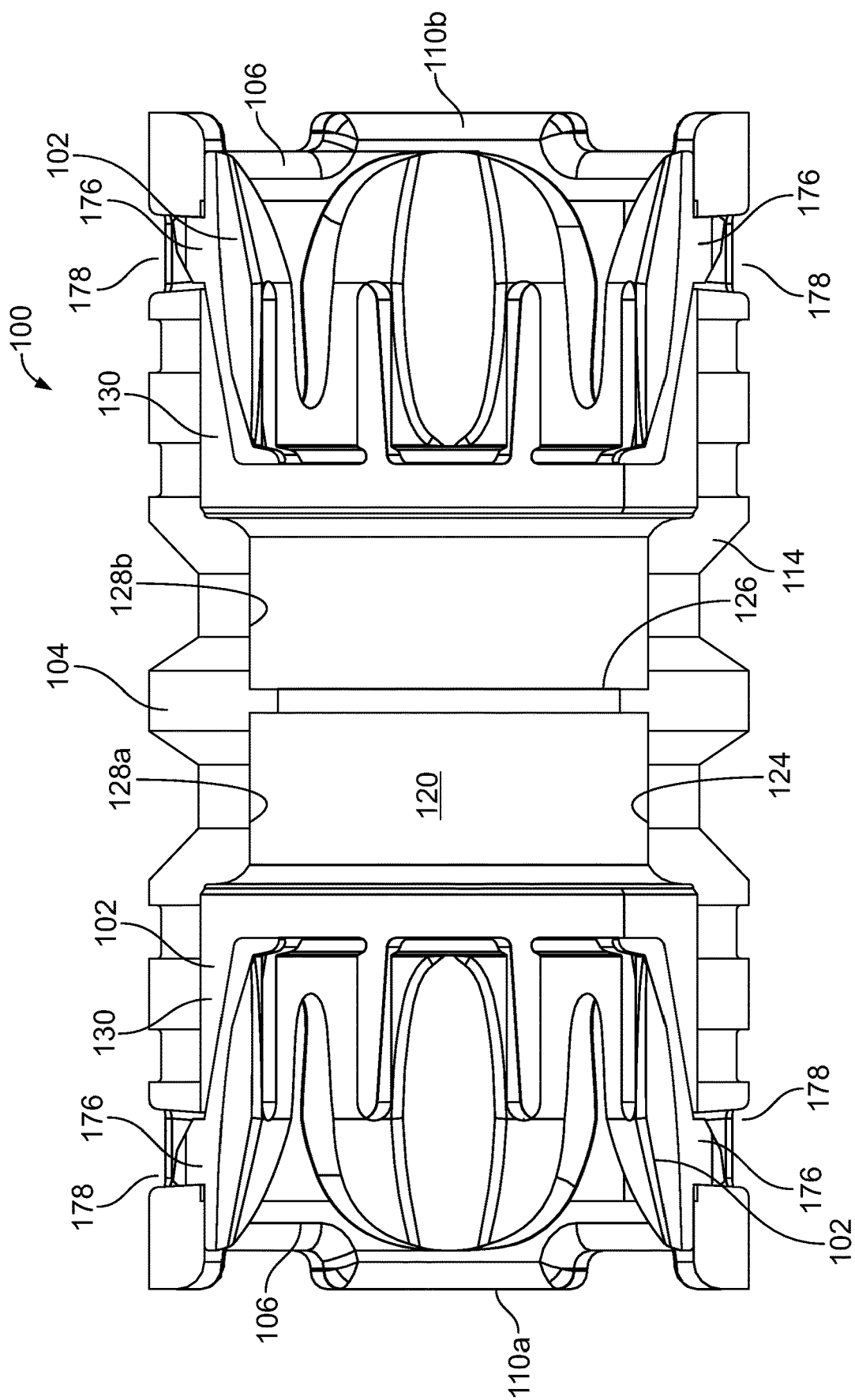
FIG. 2 illustrates a side cross sectional view of the exemplary fitting taken along line A-A in FIG. 1.

FIGS. 1 and 2 illustrate perspective and cross sectional views, respectively, of an exemplary two-piece fitting 100 according to an illustrated embodiment of the present application. The fitting 100 can include, as one piece of the two-piece fitting, one or more snap rings 102 securely coupled or attached to another piece of the fitting 100, namely a body 104 of the fitting 100 according to an illustrated embodiment of the present application. As seen, each snap ring 102 can be positioned at, or generally adjacent to, an opening 106 of the fitting 100 and/or body 104, the opening 106 being in fluid communication with an inner region 120 of the body 104. Further, depending of the type or style of fitting 100, the fitting 100 is adapted to be securely coupled to one or more tubes 108 (FIGS. 10A and 10B), including, for example, corrugated tubing, among other types of tubes. Further, the snap ring 102 and the body 104 can be constructed from a variety of different types of materials, including, for example, polyvinyl chloride (PVC) or polycarbonate, among other materials. Additionally, the body 104 may, or may not, be constructed from the same, or similar, type of material as the snap ring 102.

According to certain embodiments, the snap ring 102 can be a generally modular component in that the snap ring 102 can be configured to be securely coupled or attached to a variety of different styles or types of body 104 and/or fitting 100 configurations. For example, FIGS. 1-4 illustrate an embodiment in which the body 104 is configured to provide a splice style fitting 100 such that openings 106 are positioned at opposing first and second ends 110a, 110b of the fitting 100, the openings 106 each being generally positioned along a common longitudinal axis 112 (FIG. 4) of the fitting 100 and/or body 104 and adapted to receive insertion of a different tube 108. Further, as an associated snap ring 102 can be positioned at, or generally adjacent to, each of the openings 106, for such a body 104 and/or fitting 100 configuration, each snap ring 102 is also generally aligned along the common longitudinal axis 112, as seen for example in FIG. 2. However, according to other embodiments, the body 104 can be configured to provide a cap fitting having a generally enclosed configuration with the exception of one opening 106, with an associated snap ring 102 similar to that used with the splice style fitting 100 being positioned at, or generally adjacent to, that opening 106. Alternatively, according to other embodiments, the configuration(s) of the fitting 100 and/or body 104 can provide a T-shaped or wye shaped fitting, among other configurations, having three or more openings 106, and thus three or more associated snap rings 102 with each opening 106, at least one opening 106 and snap ring 102 being positioned along an axis that is different than, and which may or may not intersect, and axis about which one or more of the other openings 106 and associated snap rings 102 are positioned about. Additionally, according to other embodiments, the snap ring 102 can be utilized with elbow shaped fittings in which an opening 106 and associated snap ring 102 are at least angularly offset from another opening 106 and associated snap ring 102. The foregoing are merely examples of different style fittings 100 and body 104 configurations that can utilize one or more of the illustrated snap rings 102.

Additionally, according to certain embodiments, the fitting 100 can be configured to utilize a combination of different means for securing different tubes to the fitting 100. For example, according to certain types of styles of fittings, the fitting 100 can be configured to utilize one or more of the snap rings 102 to secure one or more tubes to the fitting 100, as well utilize other means, including other mechanical and/or adhesive means, for securing other tubes 108 to other openings of that same fitting 100.

The snap ring 102 can also be sized to securely engage different sized tubes 108. Moreover, for example, the snap ring 102 can be sized according to the size of the fitting 100 with which the snap ring 102 may be utilized, and moreover, the size of tube(s) 108 that is/are to be securely coupled to the fitting 100 by the snap ring 102. Thus, for example, the snap ring 102 can be sized to be securely engage, for example, ½ inch, ¾ inch, 1 inch, 1-¼ inch, 1-½ inch, 1-¾ inch, 2 inch, and 2-¼ inch diameter tubes 108, among other sizes of tubes 108, including, but not limited to, standard metric sized tubes 108, as well as custom sized tubes 108.

Figure 3:
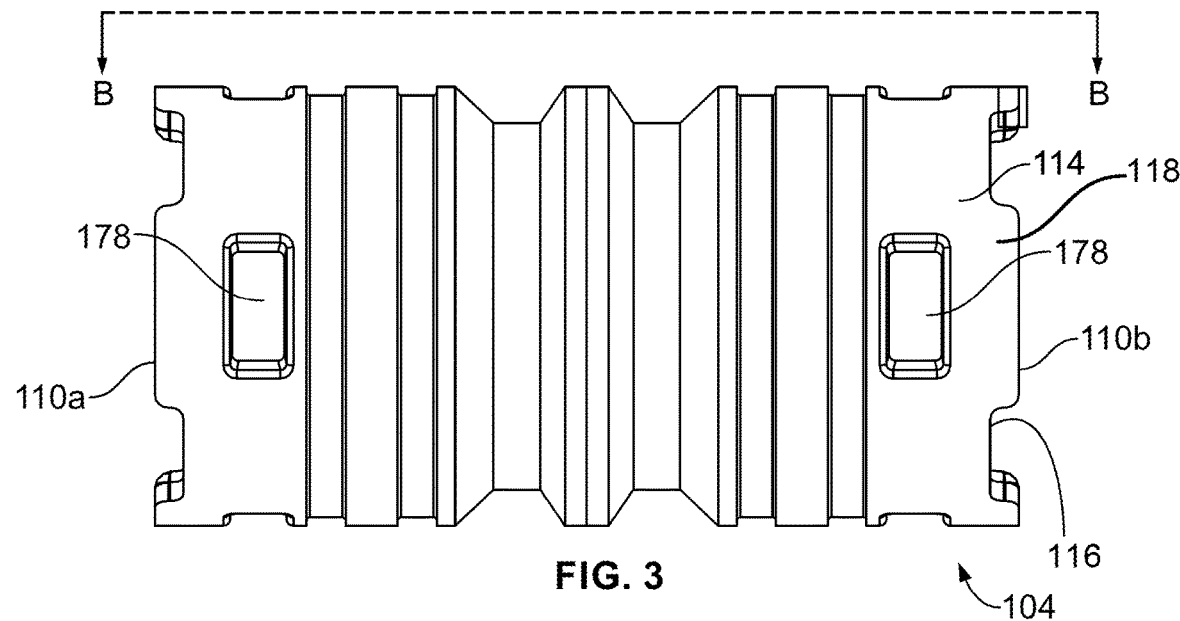
FIG. 3 illustrates a side view of a body of the exemplary fitting shown in FIGS. 1 and 2.
Figure 4:
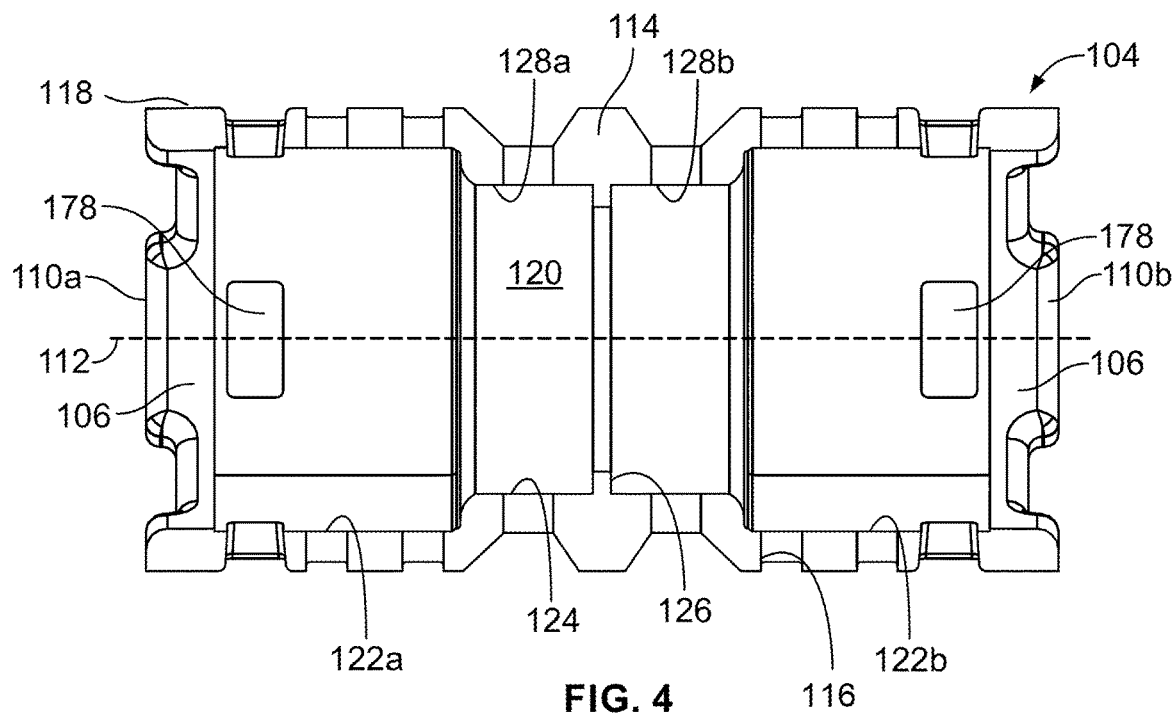
FIG. 4 illustrates a cross sectional view of the exemplary fitting taken along line B-B in FIG. 3.

Referencing FIGS. 3 and 4, the body wall 114 of the body 104 includes an inner side 116 and an outer side 118. According to certain embodiments, the outer side 118 can include a plurality of surface features, including, for example, indentations and grooves, that can be configured to enhance engagement of a tool with the body 104, and thus with the fitting 100. The inner side 116 of the body wall 114 can generally define the one or more openings 106 and the inner region 120 of the body 104. According to the exemplary embodiment, the body wall 114 extends between a first end 110a and a second end 110b of the body 104 and/or of the fitting 100. As previously discussed, according to the illustrated exemplary fitting 100 and associated body 104, an opening 106 is positioned at each of the first and second ends 110a, 110b, the openings 106 having a size, such as, for example diameter, that is sized to receive placement, as well as accommodate pivotal displacement or elastic deformation, of a snap ring 102. While according to the illustrated embodiment the openings 106 at the opposing first and second ends 110a, 110b of the fitting 100 and/or body 104 have a similar shape and size, such as, for example, diameter, according to other embodiments, the shape and/or size of the opening 106 at the first end 110a can be different than the shape and/or size of the opening 106 at the second end 110b so as to accommodate receipt of associated snap rings 102 that sized to securely engage different sized tubes 108.

According to the illustrated embodiment, the openings 106 can each extend an axial length into the inner region 120 of the body 104, and thereby each generally define an end segment 122a, 122b within the inner region 120 of the body 104. According to the illustrated embodiment, the end segments 122a, 122b can inwardly extend from the first and second ends 110a, 110b, respectively, to one or more inner segments 124. Thus, as shown in at least FIG. 4, according to the exemplary embodiment of the body 104 and fitting 100, an inner segment 124 can be positioned between the opposing end segments 122a, 122b of the body 104. The inner segment 124 can have a size, such as, for example, diameter, that is sized to receive placement of an end portion of tubes 108 that are inserted through the openings 106 at both ends 110a, 110b of the fitting 100 and/or body 104. Further, the inner segment 124 can have a size, such as an inner diameter, that is smaller than the corresponding size, such as, inner diameter, of the end segments 122a, 122b. Further, the inner segment 124 is sized to accommodate the end segments 122a, 122b being in fluid communication with each other, and thereby accommodate the opening 106 at the first end 110a being in fluid communication with the opening 106 at the second end 110b of the fitting 100 and/or body 104a.

The inner segment 124 can include a divider wall 126 positioned between opposing first and second sections 128a, 128b of the inner segment 124 that can limit the distance a tube 108 can be inserted into the fitting 100. For example, according to the illustrated embodiment, while the first and second sections 128a, 128b can have a size that can accommodate receipt of at least an end of an inserted tube 108, the divider wall 126 can provide inwardly extending projections, or have a size, such as, for example, a diameter, that is smaller than the corresponding sizes along the first and second sections 128a, 128b that creates a barrier in the inner segment 124. Moreover, the divider wall 126 provides a barrier or restriction that is sized to prevent a tube 108 that is inserted through the opening 106 at the first end 110a, and which reaches the first section 128a of the inner segment 124, from extending to the second section 128b of the inner segment 124. Similarly, the divider wall 126 also provides a barrier or restriction that is sized to prevent a tube 108 that is inserted through the opening 106 at the second end 110b and which reaches the second section 128b of the inner segment 124 from extending to the first section 128a of the inner segment 124.

Referencing FIGS. 5-9, the snap ring 102 has a ring wall 130 that extends between a first end 132a and a second end 132b of the snap ring 102, the ring wall 130 having opposing inner and outer surfaces 134a, 134b. The ring wall 130 includes a first segment 136 and a second segment 138, the first segment 136 extending between the first end 132a of the snap ring 130 and the second segment 138, and the second segment 138 extending between the first segment 136 and the second end 132b of the snap ring 130. According to certain embodiments, the first segment 136 and second segment 138 are directly connected to each other, with the other end of the first segment 136 positioned at the first end 132a of the snap ring 130, and the other end of the second segment 138 being positioned at the second end 132b of the snap ring 130.

Further, the outer surface 134b of the ring wall 130 along the first segment 136 can have, relative to at least a central longitudinal axis 140 (FIG. 7) of the snap ring 102, and angular orientation that is non-parallel to the central longitudinal axis 140. Further, this angular orientation of the outer surface 134b along the first segment 136 can be the same, or different than, a corresponding angular orientation of the outer surface 134b of the ring wall 130 along the second segment 138. For example, as shown in at least FIG. 7, the outer surface 134b of the ring wall 130 along the first segment 136 can be inwardly tapered generally from the second segment 138 and toward the first end 132a of the snap ring 130 such that, at least the first segment 136 has, at least at an initial position when a tube 108 is not inserted in the snap ring 102, a conical configuration, as shown for example, by at least FIGS. 5-7. Accordingly, an outer diameter of the snap ring 102 at the first end 132a of the snap ring 130 can be smaller than a corresponding outer diameter of the snap ring 102 at, or in the vicinity of, the location at which the outer surface 134b transitions from the first segment 136 to the second segment 138 of the ring wall 130.

According to certain embodiments, the outer surface 134b of the ring wall 130 along the second segment 138 can also have an inward taper similar to the taper of the outer surface 134b along the first segment 136. According to another embodiment, the degree of inward taper of the outer surface 134b of the ring wall 130 along the second segment 138 may be smaller than the degree of inward taper of the outer surface 134b along the first segment 136. Alternatively, the outer surface 134b of the ring wall 130 along the second segment 138 can be generally parallel to the central longitudinal axis 140 of the snap ring 102.

Figure 7:
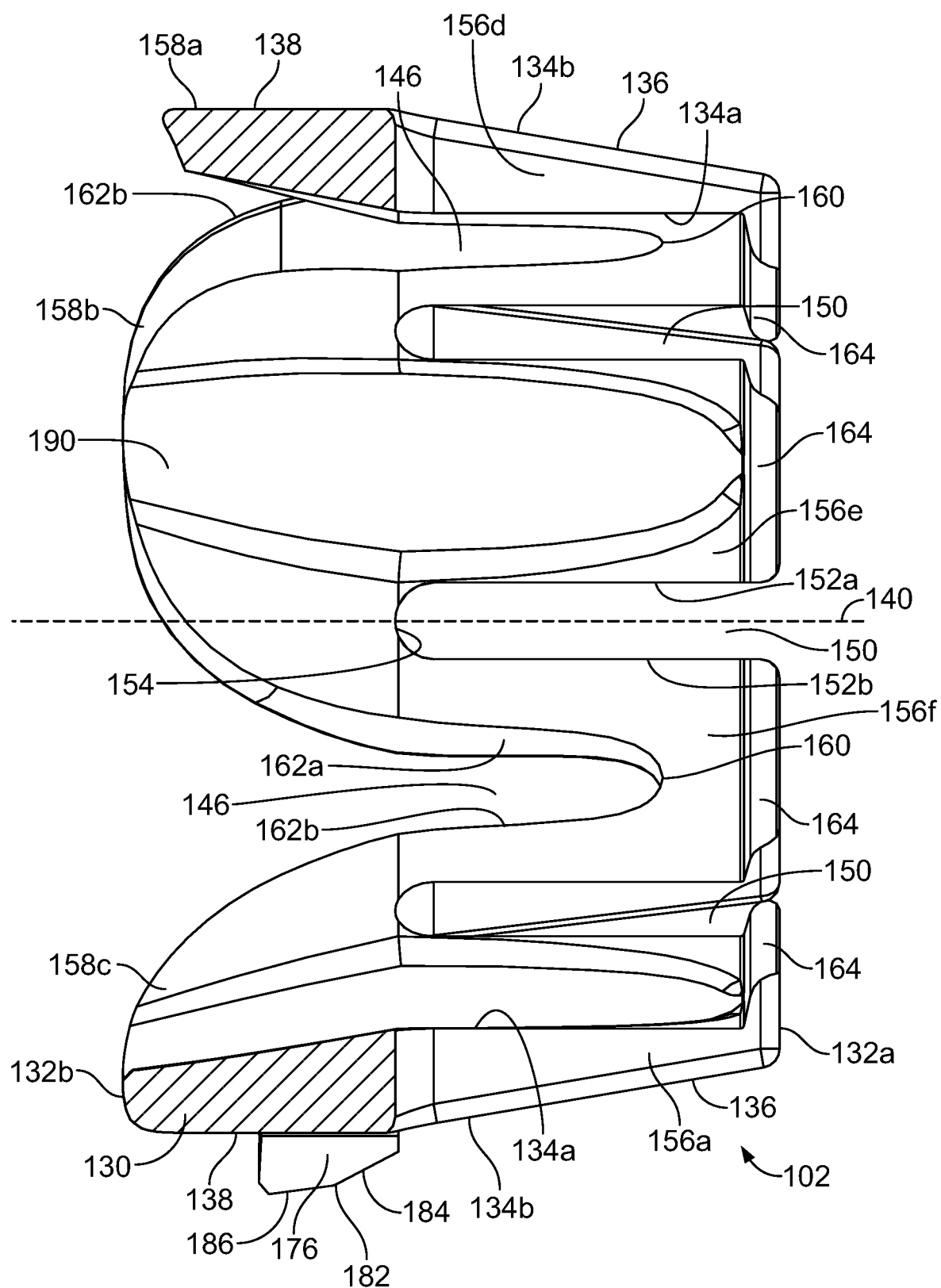
FIG. 7 illustrates a side cross sectional view of the exemplary snap fitting along line C-C in FIG. 6.

As seen in at least FIG. 7, an inner surface 134a of the ring wall 130 generally defines an interior region 142 of the snap ring 102, and extends along the first and second segments 136, 138 of the ring wall 130. With respect to the first segment 136 of the ring wall 130, the inner surface 134a can have a configuration that is different than the configuration of the inner surface 134a along the second segment 138 of the ring wall 130. For example, the inner surface 134a of the ring wall 130 along the first segment 136 can have a generally cylindrical configuration. According to such an embodiment, the inner surface 134a along the first segment 136 can have a diameter that is about the same as, if not slightly larger than, the diameter of the tube 108 that is to be inserted through the snap ring 102 and/or through the first and second segments 136, 138 of the ring wall 130. According to such an embodiment, a wall thickness of the ring wall 130 between the opposing inner and outer surfaces 134a, 134b of the ring wall 130 at the first end 132a of the snap ring 130 can be less than the wall thickness of the ring wall 130 at a location at which the first segment 136 is adjacent to the second segment 138 of the ring wall 130.

As also seen in at least FIG. 7, according to certain embodiments, the inner surface 134a of the ring wall 130 along the second segment 138 can be outwardly tapered from, or around the inner surface 134a of the first segment 136 of the ring wall 130 to the second end 132b of the snap ring 130. Such an outward taper, which can generally extend along the length of the inner surface 134a of the second segment 138 of the ring wall 130, can provide the snap ring 102 with a relief that can enhance the ease with which a tube 108 can be inserted into the interior region 142 of the snap ring 102. Moreover, such a taper in which the diameter of the inner surface 134a gradually reduces from a larger diameter at the second end 132b of the snap ring 130 can provide for an engagement of the tube 108 with the ring wall 130 in a manner that can accommodate a gradual expansion and/or deformation of the snap ring 102 about the tube 108 as the tube 108 is being inserted further into the snap ring 102 and associated fitting 100, which may reduce the degree of insertion force that is to be used to insert the tube 108 through the snap ring 102.

The ring wall 130 can also include a first slot set 148 having a plurality of first slots 150 that extend from, and through, the first end 132a of the snap ring 130 in a first direction toward the second end 132b of the snap ring 130. The first slots 150 of the first slot set 148 can each be defined by a pair of opposing first slot walls 152a, 152b that extend through the inner and outer surfaces 134a, 134b of the ring wall 130, as well as through the first end 132a of the snap ring 130 and along at least a portion of the first segment 136 of the ring wall 130 to a first end wall 154 of the first slot 150. The first slot walls 152, 152b can be generally parallel to each other, as well as generally parallel to the central longitudinal axis 140 of the snap ring 102. According to certain embodiments, the first end wall 154 of the first slots 150 of the first slot set 148 can be at, or around, the transition from the first segment 136 to the second segment 138 of the ring wall 130. Thus, according to certain embodiments, the first slots 150 of the first slot set 148 may extend through the first segment 136, but not into the second segment 138, of the ring wall 130.

The portions of the first segment 136 of the ring wall 130 that are positioned between opposing first slots 150 of the first slot set 148 can each provide the snap ring 102 with a ring finger 156a-h. As discussed below, the configuration of the snap ring 102, including the size, shape, and/or position of the ring fingers 156a-h, can facilitate the ring fingers 156a-h exerting a generally inwardly directed force against a tube 108 that is inserted into the fitting 100, and moreover, that is inserted and/or positioned within the snap ring 102. Further, the configuration of the first slots 150 of the first slot set 148 can provide the ring fingers 156a-h with a column configuration that can at least assist in providing strength and stiffness to the ring fingers 156a-h to resist forces associated that can be associated with pulling the inserted tube 108 out of the fitting 100, and out of locking engagement with the snap ring 102.

While the number of first slots 150 of the first slot set 148 can vary, according to the illustrated embodiment, the first slot set 148 comprises eight first slots 150, thereby providing the snap ring 102 with eight ring fingers 156a-h. Additionally, the first slots 150 can be generally equally spaced apart from adjacent first slots 150. Thus, for example, according to the illustrated embodiment, the first slots 150 are generally spaced about 45 degrees apart from an adjacent first slot 150.

Figure 5:
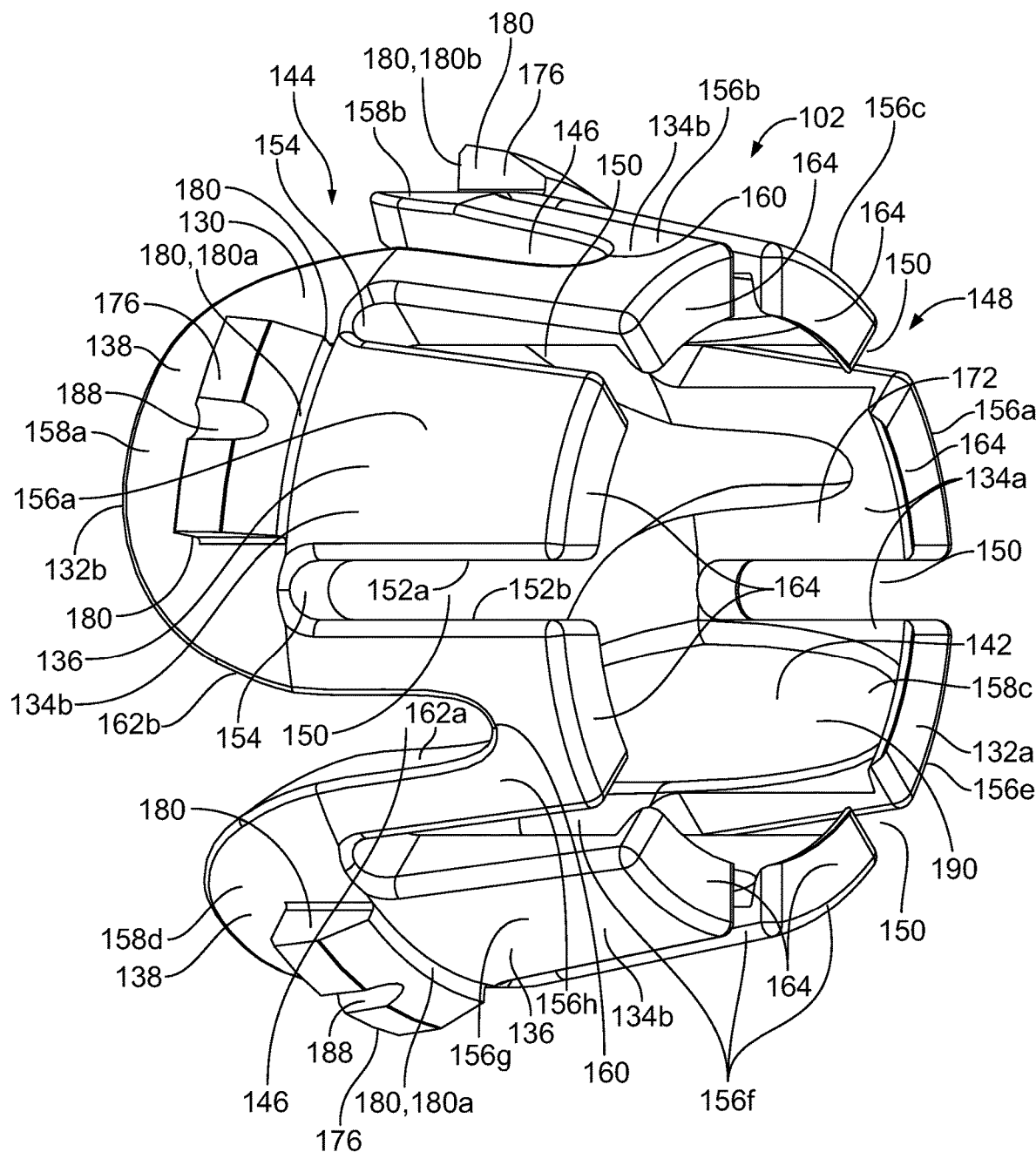
FIG. 5 illustrates a front side perspective view of the exemplary snap fitting shown in FIGS. 1 and 2.
Figure 6:
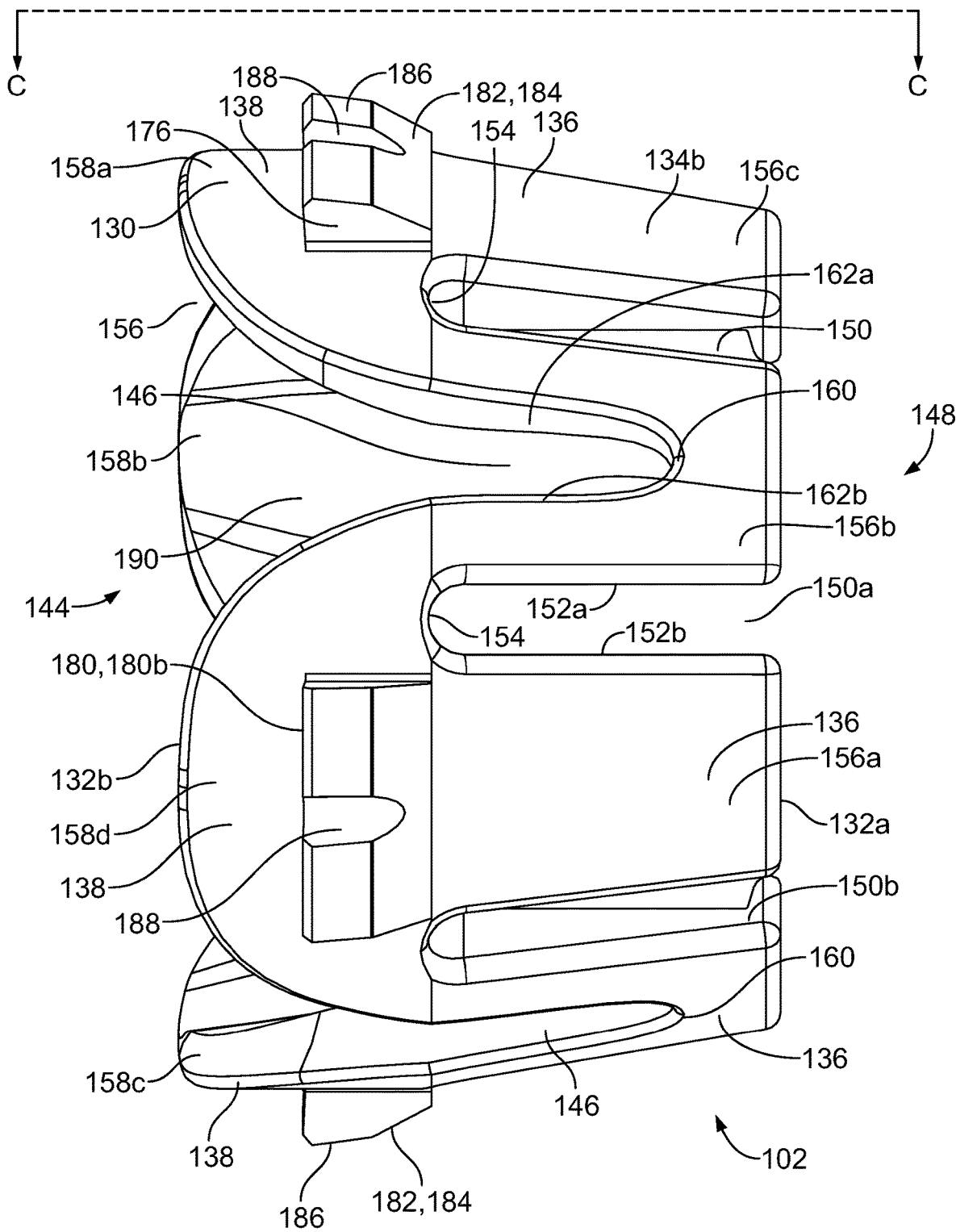
FIG. 6 illustrates a side view of the exemplary snap fitting shown in FIG. 6.

As seen in at least FIGS. 5-7, the ring wall 130 can also include a second slot set 144 having a plurality of second slots 146 that extend through both the inner and outer surfaces 134a, 134b of the ring wall 130, and through the second end 132b of the ring wall 130 and along the second segment 138 and through a portion of the first segment 136 of the ring wall 130. As seen in FIG. 7, according to certain embodiments, the second slots 146 of the second slot set 144 can extend through at least half, if not more, of the axial length of the first segment 136 such that second end walls 160 of the second slots 146 of the second slot set 144 are in relatively close proximity, or generally adjacent to, the first end 132a of the snap ring 130. Thus, as shown in at least FIG. 5, the first and second slots 150, 146 of the first and second slot sets 148, 144, respectively, can extend in opposing directions, and by distances into the first segment 136 of the ring wall 130 such that the second end walls 160 of the second slots 146 of the second slot set 144 are closer to the first end 132a of the snap ring 130 than the first end walls 154 of the first slots 150 of the first slot set 148. Conversely, the first end walls 154 of the first slots 150 of the first slot set 148 can be closer to the second end 132b of the snap ring 130 than the second end walls 160 of the second slots 146 of the second slot set 144. Thus, without converging into each other, the second slots 146 of the second slot set 144 can generally linearly overlap the first slots 150 of the first slot set 148.

Each second slot 146 of the second slot set 144 may be defined, at least in part, by a pair of opposing second slot walls 162a, 162b. As seen in at least FIG. 5, the second slot walls 162a, 162b can, at least along the second segment 138 of the ring wall 130, extend or curve in opposite directions, while being generally parallel to each other along at least portion of the first segment 136 of the ring wall 130 until being joined together at the second end wall 160 of the second slot 146. Such a configuration provides the second slots 146 of the second slot set 144 with a first width between the second slot walls 162a, 162b at a base of the second slot 146 that is positioned around the second end 132b of the snap ring 130, and a second, smaller width between the second slot walls 162a, 162b at an opposing portion of the second slot 146 that is around the second end wall 160 of the second slot 146. Such a configuration for the second slot set 144 can assist at least the second segment 138 of the ring wall 130 being configured to exert a generally outwardly directed force against the inner side 116 of the body wall 114 when the snap ring 102 is positioned within the inner region 120 of the body 104.

While the number and position of the second slots 146 of the second slot set 144 can vary, according to the illustrated embodiment, the second slot set 144 comprises four second slots 146 that are equally separated from adjacent second slots 146 along the snap ring 102. Moreover, according to embodiments in which the second slot set 144 comprises four second slots 146, each second slot 146 can be angularly positioned approximately 90 degrees from an adjacent second slot 146. According to such an embodiment, the second slots 146 of the second slot set 144 can divide the snap ring 102 into four ring segments 158a-d, each ring segment 158a-d being positioned between two adjacent second slots 146 of the second slot set 144. Further, each ring segment 158a-d can be adjoined to an adjacent ring segment 158a-d generally around the first end 132a of the snap ring 130 at a location above the second end wall 160 of a second slot 146 of the second slot set 144. Further, the curvature of the second slots 146 of the second slot set 144 at least in the region of the base of the second slots 146 can provide each ring segment 158a-d with a generally U-shaped outline or outer profile.

The illustrated combination of eight equally spaced first slots 150 of the first slot set 148 and four equally spaced second slots 146 of the second slot set 144 can result in a configuration in which the first slots 150 of the first slot set 148 is offset by approximately 22.5 degrees from the nearest adjacent second slot 146 of the second slot set 144. Such configuration can result in each of the four ring segments 158a-d that are generally defined by the second slots 146 of the second slot set 144 having two second slots 146a-h of the first slot set 148, with one ring finger 156a, 156c, 156e, 156g positioned there-between within each ring segment 158a-d. Thus for example, a first ring segment 158a can include two second slots 146a, 146b of the first slot set 144, as well as a ring finger 156a positioned there-between. Further, such a first ring segment 158a can, on one side of the first ring segment 158a, be adjoined to another ring segment 158b by another ring finger 156b that will be part of both of the ring segments 158a, 158b. Similarly, the first ring segment 158a can also be adjoined, on an opposing side of the first ring segment 158a, to another ring segment 158d by another ring finger 156h that will be part of both of those ring segments 158a, 158d. Thus, according to the illustrated embodiment, every other or ring finger 156b, 156d, 156f, 156h, or half of the ring fingers 156a-h, can be part of, and join to, two adjacent ring segments 158a-d.

Those ring fingers 156b, 156d, 156f, 156h which extend across adjacent ring segments 158a-d can be positioned such that a second slot 146 of the second slot set 144 extends along a central axis of each of those ring fingers 156b, 156d, 156f, 156h, and terminates in those ring fingers 156b, 156d, 156f, 156h at a location that is relatively close proximity to the first end 132a of the ring wall 130. The inclusion of a second slot 146 of the second slot set 144 in those ring fingers 156b, 156d, 156f, 156h can improve the ease with which those ring fingers 156b, 156d, 156f, 156h can be outwardly pivoted or elastically deformed during insertion of a tube 108 through the snap ring 102, thereby assisting in further reducing the force that is to be utilized in inserting a tube 108 into the fitting 100 and through the snap ring 102. However, similar to the other ring fingers 156a, 156c, 156e, 156g through which a second slot 146 of the second slot set 144 does not extend, such a configuration of the ring fingers 156b, 156d, 156f, 156h still maintains a stiffness and spring force that allows those ring fingers 156b, 156d, 156f, 156h to also exert an inwardly directed force against a tube 108 that has been inserted through the snap ring 102, as well as also provide resistance to prevent the inserted tube 108 from being pulled out of the fitting 100, and moreover out of the snap ring 102.

As seen in at least FIGS. 5 and 8-10B, each ring finger 156a-h can also include an inwardly directed retention projection 164, at least a portion of the retention projection 164 positioned and sized to fit in at least a portion of a recess 166 between corrugated sections 168 of the inserted tube 108. According to the illustrated embodiment, the retention projection 164 is positioned at the first end 132a of the snap ring 130 and inwardly extends in a direction that is generally perpendicular to, or otherwise intersects, the central longitudinal axis 140 of the snap ring 102. As seen in at least FIGS. 8 and 9, the retention projection 164 can inwardly extend to an end wall 170 of the retention projection 164. According to certain embodiments, the end wall 170 can have a generally curved surface having a shape that may, or may not, conform to the size and shaped of the portion of the tube 108 that is, or will be, adjacent to the end wall 170 when the retention projection 164 is positioned in the recess 166. Further, the end walls 170 can extend inwardly such that the collection of end walls 170 of the retention projections 164 define an opening 172 to the interior region 142 of the snap ring 102 that has a size, such as, for example, diameter, that is smaller than the diameter provided by the adjacent inner surface 134a of the first segment 136 of the ring wall 130. As shown in by at least FIGS. 10A and 10B, the end wall 170 can also be downwardly sloped from a first side 174a to a second side 174b of the retention projection 164, and can further include a chamfer or radius at the transition between the second side 174b and end wall 170 of the retention projection 164. Such a configuration can assist in facilitating a sliding engagement between the end wall 170 and the outer surface of the tube 108 as the tube 108 is being inserted through the snap ring 102 and into the fitting 100.

Unlike the second side 174b and/or the end wall 170 of the retention projection 164, the first side 174a of the retention projection 164 can be configured to resist sliding engagement between the retention projection 164 and an adjacent corrugated section 168 of the tube 108. To the contrary, the first side 174a of the retention projection 164 can be configured to provide a barrier that can, at least when a force is being exerted against the tube 108 that seeks to pull the tube out of the fitting 100, abut against the adjacent corrugated section 168 of the tube 108 in a manner that resists such removal of the tube 108 from the snap ring 102, and thus from the fitting 100. Thus, according to certain embodiments, the first sides 174a of the retention projections 164 can be oriented to be, when the tube 108 is secured to the snap ring 102, generally parallel to an opposing wall of the adjacent corrugated section 168 and/or generally perpendicular to the central longitudinal axis 140 of the snap ring 102.

The outer surface 134b of the second segment 138 of the ring wall 130 can also include a plurality of retention tabs 176 that are each sized to be received in a mating retention opening 178 in the body wall 114 of the body 104. The retention tabs 176 are configured to be inserted into the retention openings 178 of the body 104 in a manner that secures the snap ring 102 to the body 104 at a location at, or generally adjacent to, an opening 106 of the body 104 or fitting 100. Each retention tab 176 can project generally outwardly from the outer surface 134b of the ring wall 130. Additionally, according to the illustrated embodiment, each ring segment 158a-d can include one retention tab 176, with the retention tab 176 being located on a portion of a second segment 138 of the ring wall 130 that is adjacent to a ring finger 156a, 156c, 156e, 156g that does not have a second slot 146 of the second slot set 144 extending through the ring finger 156a, 156c, 156e, 156g.

As seen in at least FIGS. 5 and 7, each retention tab 176 has a plurality of sidewalls 180 that extend from the outer surface 134b of the second segment 138 of the ring wall 130 to an upper wall 182 of the retention tab 176. The plurality of sidewalls 180 can be configured together in a variety of different cross sectional shapes, including, for example, square and rectangular, among other shapes. However, the heights of the sidewalls 180 between the ring wall 130 and the upper wall 182 of the retention tab 176 can vary. Such variation can accommodate the upper wall 182 having one or more slopes surfaces that can assist in the insertion of the snap ring 102 into the inner region 120 of the body 104 to a depth at which the retention tabs 176 are positioned to be received within the mating retention openings 178 of the body 104. Additionally, such a configuration can assist in pivotal or angular displacement of the retention tab 176 within the mating retention opening 178 as a tube 108 is inserted into the snap ring 102, as discussed below. For example, the upper wall 182 of the retention tab 176 can have a first sloped surface 184 that extends from a front sidewall 180a of the plurality of sidewalls 180 to generally a mid-section of the upper wall 182, and a second sloped surface 186 that extends from the first sloped surface 184 to a rear sidewall 180b of the plurality of sidewalls 180, the front and rear sidewalls 180a, 180b being on opposing sides of the retention tab 176, and the rear sidewall 180b being closer to the second end 132b of the snap ring 130 than the front sidewall 180a. Additionally, as illustrated, the degree of slope of the first sloped surface 184 can be greater than the degree of slope of the second sloped surface 186. Further, according to certain embodiments, the upper wall 182 of the retention tab 176 can also include a groove or concave recess 188 that extends through the second sloped surface 186 and a portion of the first sloped surface 184 in a direction that is generally perpendicular to the front and rear sidewalls 180a, 180b. According to certain embodiments, the groove 188 can be sized to receive insertion of a tool that may be used to exert a generally downward force against the retention tab 176 in a direction that can generally inwardly displace the retention tab 176 out from the retention opening 178 in the body wall 114 of the body 104.

Figure 8:
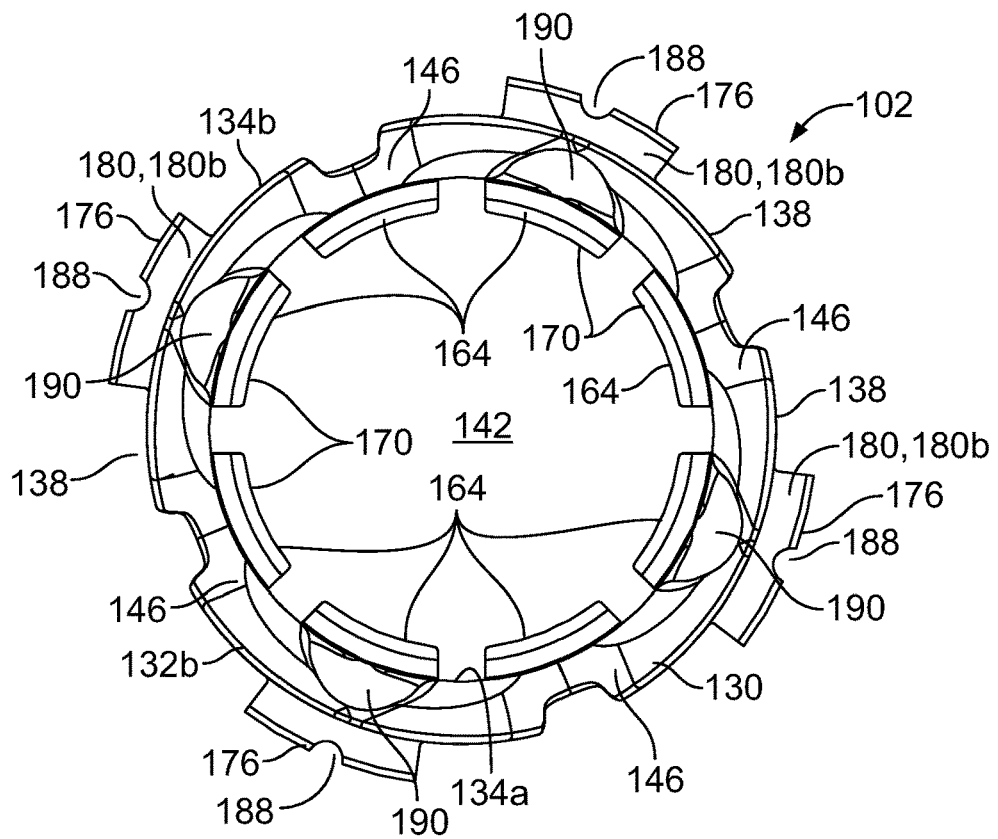
FIGS. 8 and 9 illustrate rear and front side views, respectively, of the exemplary snap fitting shown in FIG. 6.
Figure 9:
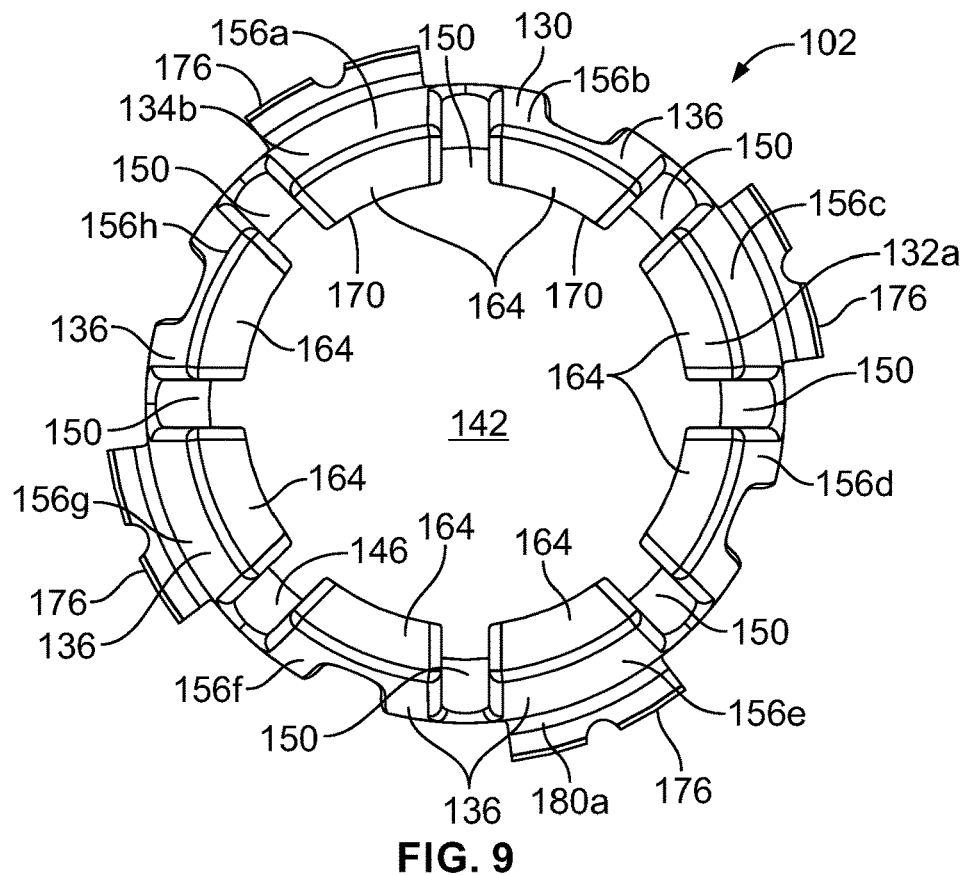

As seen in at least FIGS. 5, 7, and 8, each retention ring segment 158a-d includes an inner recess 190 that extends into, and along, the inner surface 134a of the first and second segments 136, 138 of the ring wall 130. According to the illustrated embodiment, an inner recess 190 can be generally centrally located along the inner surface 134a of each ring segment 158a-d, and thus extend below at least some of the retention fingers 156a, 156c, 156e, 156g associated with those ring segments 158a-d. Further, the inner recess 190 can be generally concave into the ring wall 130, with the apex of the depth at which the inner recess 190 extends into the ring wall 130 being generally positioned at the intersection of the first and second segments 136, 138 of the ring wall 130. Additionally, the inner recess 190 can also have a generally oval cross sectional shape such that the inner recess 190 also reaches its largest width at the intersection of the first and second segments 136, 138 of the ring wall 130, and including, generally in the vicinity of the area between first end walls 154 of two adjacent first slots 150 of the first slot set 148 of the ring segment 158a-d. As the inner recess 190 extends into the ring wall 130, the portions of the ring wall 130 at which the inner recesses 190 are located may be sized such that those portions of the ring wall 130 do not contact the tube 108 as the tube 108 is being inserted into the snap ring 102, and thus may contribute to reducing the insertion force used to insert the tube 108 through the snap ring 102. Additionally, the inner recesses 190 can be configured to at least assist in the pivoting and/or elastic deformation of the snap ring 102 as a tube 108 is inserted into the snap ring 102, and thus further assist with the ease of insertion of, and the relatively lower insertion force used to insert, the tube 108 through the snap ring 102.

FIG. 10A illustrates the pivoting or deformation of a ring finger 156 of a ring segment 158 as a tube 108 is being inserted through the snap ring 102, and thus into the fitting 100. As seen, compared to an initial position prior to insertion of the tube 108, as shown in FIG. 2, the ring finger 156 of the ring segment 158 in FIG. 10A has been pivoted or deformed in a generally clockwise direction such that at least the first segment 136 is moved outwardly into closer proximity to the adjacent inner side 116 of the body wall 114 at the corresponding end segment 122a, 122b of the body 104. Such outwardly pivoting or deformation of the ring finger 156 can decrease the degree at which the first segment 136, and thus the ring finger 156, is inwardly tapered, and thus increase the size, such as, for example, diameter, across the inner surface 134a of the ring wall 130 at least in the vicinity of the first end 132a of the snap ring 130. Conversely, compared to the initial position shown in FIG. 2, in FIG. 10A the second segment 138 of the ring wall 130 of the snap ring 102 has been pivoted or deformed in a generally clockwise direction such that at least the second segment 138 of the ring body wall 114 of the snap ring 102 is moved generally inwardly and away from the adjacent inner side 116 of the body wall 114 at the corresponding end segment 122a, 122b of the body 104. As also seen in FIG. 10A, the configuration of the upper wall 182 of the retention tab 176, including the configuration of the first sloped surface 184 can prevent the retention tab 176 from engaging with a body wall 114 of the body 104 that defines the retention opening 178 so that the retention tab 176 does not interfere with the pivotal displacement or deformation of the snap ring 102.

Given the configurations of at least the first slots 150 of the first slot set 148, the first segment 136 of the ring wall 130 may resist, or provide a spring force against, such outwardly pivoting or deformation of the ring fingers 158a-h, while the second portion of the ring wall 130 resists, or provides a spring force against, such inwardly pivoting or deformation. Accordingly, at least when insertion of the tube 108 is completed, such as, for example, when the inserted end of the tube 108 contacts, or is generally adjacent to, the divider wall 126 within the inner region 120 of the body 104, the generally inwardly directed force of the ring fingers 156a-h can provide a force that facilitates the associated retention projections 164 being inserted into a recess 166 between adjacent corrugated sections 168 of the inserted tube 108, as illustrated for example in FIG. 10B. Such displacement of the retention projections 164 into the recesses 166 can also be assisted by the sloped configuration of the end wall 170 and/or the associated transition between the end wall 170 and a second sidewall 174b of retention projections 164, which can aid in the retention projections 164 with sliding around a corrugated section 168 of the tube 108 and into an adjacent recess 166 between corrugated sections 168 of the tube 108. Once the retention projection 164 is inserted into the recesses 166 of the tube 108, the first sidewall 174a of the retention projection 164 is positioned to abut an adjacent corrugated section 168 of the tube 108 in a manner that at least assists in preventing the tube 108 from being pulled back out of the fitting 100. Additionally, each of the ring fingers 156 are structure to provide support columns that further provide structural support and stiffness to the associated retention projections 164 to prevent the tube 108 from being pulled back out of the snap ring 102, and thus out from the fitting 100. Further, as previously discussed, the configuration of the ring fingers 156 and first slot set 148 can provide the ring fingers 156a-h with an inwardly directed spring force that can pivot or elastically deform the ring fingers 156a-h generally in the direction of the tube 108, thereby causing the associated retention projection 164 to dig or pinch inwardly into or towards the tube 108, thereby further enhancing the resistance to tube 108 being pulled out of the snap ring 102 and the fitting 100.

Such inwardly pivotal displacement or elastic deformation of the ring fingers 156 can also be accompanied by outwardly pivotal displacement or elastic deformation of the second segments 138 of the ring wall 130, as also shown, for example, in FIG. 10B. Moreover, with the tube 108 inserted in the snap ring 102 and securely engaged with the ring fingers 156a-h, the second segments 138 of the ring wall 130 can be structured to provide an outwardly directed spring force that can at least assist in pressing the retention tabs 176 into the associated retention openings 178 in a manner that can at least assist providing a locking engagement between the snap ring 102 and the body 104. Thus, once the snap ring 102 securely engages the tube 108, removal of the tube 108 from the fitting 100 may not be possible without cutting the fitting 100 from the tube 108, or cutting the tube 108 from the fitting 100.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A fitting adapted to be coupled to a tube, the fitting comprising:
    a body having an opening, the opening being in fluid communication with an inner region of the body; and
    a snap ring positioned within the inner region, the snap ring having a ring wall, a plurality of first slots, a plurality of second slots, and a plurality of ring fingers, the ring wall extending between a first end and a second end of the snap ring, an inner surface of the ring wall defining an interior region of the snap ring that is sized to receive insertion of the tube through the snap ring, each first slot of the plurality of first slots extending through the first end and in a direction generally toward the second end along a first segment of the ring wall, and ending at a first end wall of the first slot, an outer surface of the first segment having a conical configuration, wherein the outer surface of the ring wall along a second segment has a conical configuration that has a slope that is different than a slope of the conical configuration of the first segment;
    each ring finger of the plurality of ring fingers being defined at least in part by an area of the first segment that is positioned between adjacent first slots of the plurality of first slots,
    each second slot of the plurality of second slots extending from the second end in a direction generally toward the first end to a second end wall, and extending into at least some of the plurality of ring fingers, and wherein the second end wall is in closer proximity than the first end wall to the first end of the snap ring:
    wherein the ring wall further comprises the second segment, the second segment being positioned between the second end of the snap ring and the first segment of the ring wall, the inner surface of the ring wall being outwardly tapered along the second segment from the first segment to the second end;
    wherein the first segment is configured to provide a generally inwardly directed spring force towards the interior region of the snap ring, and the second segment is configured to provide a generally outwardly directed spring force in a direction that is generally away from the interior region of the snap ring; and
    wherein the first slots of the plurality of first slots do not extend into the second segment.

2. The fitting of claim 1, wherein the plurality of ring fingers comprises a first set of ring fingers and a second set of ring fingers, the plurality of second slots extending into the first set of ring fingers but not into the second set of ring fingers, and wherein an inner recess extends into the inner surface of the area of the first segment associated with each ring finger of the second set of ring fingers, the inner recess also extending into at least a portion of the inner surface of the second segment.

3. The fitting of claim 2, wherein a depth of the inner recess reaches an apex at a transition between the first segment and the second segment.

4. The fitting of claim 1, wherein each ring finger of the plurality of ring fingers includes a retention projection that projects inwardly from the ring finger toward a central longitudinal axis of the snap ring and defines at least a portion of an opening to the interior region.

5. The fitting of claim 1, wherein the snap ring further includes a plurality of retention tabs outwardly extending from the second segment, and wherein the body includes a plurality of retention openings, each retention tab of the plurality of retention tabs being positioned in a retention opening of the plurality of retention openings.

6. The fitting of claim 1, wherein the plurality of first slots are angularly offset relative to the plurality of second slots.

7. The fitting of claim 1, wherein each second slot of the plurality of second slots is defined by a pair of opposing second slot walls, a width between the pair of opposing second slot walls at the second end of the snap ring being larger than a width between the pair of opposing second slot walls along the first segment.

8. A fitting adapted to be coupled to a tube, the fitting comprising:
    a body having a body wall, the body wall defining a plurality of openings and an inner region of the body, each opening of the plurality of openings being in fluid communication with the inner region and the other openings of the plurality of openings, the body further including a plurality of retention openings; and a plurality of snap rings, each snap ring of the plurality of snap rings positioned within the inner region and adjacent to an opening of the plurality of openings, each snap ring of the plurality of snap rings having a ring wall that extends between a first end and a second end of the snap ring, the ring wall having a first slot set, a second slot set, an inner surface, and an outer surface, the inner surface defining an interior region of the snap ring that is sized to receive insertion of the tube through the snap ring, the outer surface having a conical configuration, a plurality of retention tabs extending outwardly from the outer surface of the ring wall and positioned in one of the plurality of retention openings to secure the snap ring to the body, each first slot of the first slot set defined by a pair of opposing first slot walls in the ring wall that extend through the ring wall and from the first end of the snap ring in a direction toward the second end of the snap ring to a first end wall of the first slot, the ring wall further comprising a plurality of ring fingers, each ring finger of the plurality of ring fingers being defined at least in part by an area of the ring wall positioned between adjacent first slots of the first slot set, each ring finger including a retention projection at the first end of the snap ring, the retention projection extending inwardly from the ring finger and defining at least a portion of an opening to the interior region of the snap ring, the opening to the interior region of the snap ring having a diameter that is smaller than a diameter of the interior region, and each second slot of the second slot set defined by a pair of opposing second slot walls in the ring wall that extend through the ring wall and from the second end of the snap ring in a direction toward the first end of the snap ring to a second end wall of the second slot, the second end wall being closer than the first end wall to the first end of the snap ring, and wherein each second slot extends into one ring finger of the plurality of ring fingers.

9. The fitting of claim 8, wherein the second slot set extends into some, but not all, of the plurality of ring fingers.

10. The fitting of claim 9, wherein a width between the pair of opposing second slot walls at the second end of the snap ring is larger than a width between the pair of opposing second slot walls at a location adjacent to the second end wall.

11. The fitting of claim 8, wherein the ring wall is configured to provide the plurality of ring fingers with a generally inwardly directed spring force, the ring wall further configured to provide an outwardly directed spring force at least at the second end of the snap ring.

12. The fitting of claim 8, wherein the inner surface is outwardly tapered from around the first end wall to the second end of the snap ring.

13. The fitting of claim 8, wherein the inner region of the body includes a divider wall having an inner diameter that is smaller than a diameter of at least one opening of the plurality of openings.

14. A snap ring for a fitting that is adapted to be coupled to a tube, the snap ring comprising:
a ring wall that extends between a first end and a second end of the snap ring, an inner surface of the ring wall defining an interior region of the snap ring that is sized to receive insertion of the tube through the snap ring;
a plurality of first slots, each first slot of the plurality of first slots extending through the first end and in a direction generally toward the second end along a first segment of the ring wall, and ending at a first end wall of the first slot, an outer surface of the first segment having a conical configuration, wherein the outer surface of the ring wall along a second segment has a conical configuration that has a slope that is different than a slope of the conical configuration of the first segment;
a plurality of ring fingers, each ring finger of the plurality of ring fingers being defined at least in part by an area of the first segment that is positioned between adjacent first slots of the plurality of first slots; and
a plurality of second slots, each second slot of the plurality of second slots extending from the second end in a direction generally toward the first end to a second end wall, and extending into at least some of the plurality of ring fingers, the second end wall being in closer proximity than the first end wall to the first end of the snap ring; and
the second segment being positioned between the second end of the snap ring and the first segment of the ring wall, the inner surface of the ring wall being outwardly tapered along the second segment from the first segment to the second end.

15. The fitting of claim 14, wherein the first segment is configured to provide a generally inwardly directed spring force towards the interior region of the snap ring, and the second segment is configured to provide an outwardly directed spring force in a direction that is generally away from the interior region of the snap ring, and wherein each ring finger of the plurality of ring fingers includes a retention projection that projects inwardly from the ring finger toward a central longitudinal axis of the snap ring and defines at least a portion of an opening to the interior region.

\* \* \* \* \*